US011898408B2

(12) United States Patent
Jamison et al.

(10) Patent No.: US 11,898,408 B2
(45) Date of Patent: Feb. 13, 2024

(54) SYSTEM TO MANAGE WELLBORE SERVICING FLUIDS CONTAINING PARAMAGNETIC MATERIALS

(71) Applicant: Halliburton Energy Services, Inc., Houston, TX (US)

(72) Inventors: Dale E. Jamison, Humble, TX (US); William W. Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 134 days.

(21) Appl. No.: 16/960,338

(22) PCT Filed: Sep. 9, 2019

(86) PCT No.: PCT/US2019/050249

§ 371 (c)(1),
(2) Date: Jul. 7, 2020

(87) PCT Pub. No.: WO2021/050043

PCT Pub. Date: Mar. 18, 2021

(65) Prior Publication Data

US 2022/0195820 A1 Jun. 23, 2022

(51) Int. Cl.
*E21B 21/06* (2006.01)
*B03C 1/32* (2006.01)

(52) U.S. Cl.
CPC .......... *E21B 21/063* (2013.01); *E21B 21/062* (2013.01); *B03C 1/32* (2013.01)

(58) Field of Classification Search
CPC ...... E21B 21/06; E21B 21/062; E21B 21/063; B03C 1/035; B03C 1/32; B03C 2201/18
See application file for complete search history.

(56) References Cited

U.S. PATENT DOCUMENTS 3,966,590 A 6/1976 Boom et al.
4,269,279 A 5/1981 House
(Continued)

FOREIGN PATENT DOCUMENTS

WO WO 2016/049108 A1 3/2016

OTHER PUBLICATIONS

International Search Report and the Written Opinion of the International Search Authority, or the Declaration, dated Jun. 8, 2020, PCT/US2019/050249, 13 pages, ISA/KR.
(Continued)

*Primary Examiner* — Michael McCullough
*Assistant Examiner* — Kalyanavenkateshware Kumar
(74) *Attorney, Agent, or Firm* — Thomas Rooney; C. Tumey Law Group PLLC

(57) ABSTRACT

Systems and methods for separating paramagnetic material in wellbore return fluid. A quadrupole magnet system is disposed along conduit so that a paramagnetic field is symmetrically formed about a central axis of the conduit. A wellbore return fluid containing paramagnetic material is directed through the conduit. The paramagnetic field drives the paramagnetic material outward towards the perimeter of the conduit, thereby concentrating fluid with little or no paramagnetic material along the central axis of the conduit. An outlet is disposed along the flow path of a portion of the concentrated fluid. In some embodiments, the outlet is positioned along the central axis, while in other embodiments, the outlet is positioned along the conduit wall. The paramagnetic material may be weighting material used to prepare drilling mud.

20 Claims, 6 Drawing Sheets

(56) References Cited

U.S. PATENT DOCUMENTS

| | | | | |
|---|---|---|---|---|
| 5,466,574 | A * | 11/1995 | Liberti | B03C 1/035 435/7.5 |
| 5,944,195 | A | 8/1999 | Huang et al. | |
| 6,902,066 | B2 | 6/2005 | Yang | |
| 8,298,428 | B2 | 10/2012 | Hagen | |
| 2016/0362952 | A1 | 12/2016 | Williamson et al. | |
| 2017/0335643 | A1* | 11/2017 | Allen | B03B 5/442 |
| 2018/0323052 | A1* | 11/2018 | Baba | H01J 49/38 |
| 2019/0241448 | A1 | 8/2019 | Orler | |

OTHER PUBLICATIONS

Zeng et al., "The Latest Application of SLon Vertical Ring and Pulsating High-Gradient Magnetic Separator," Minerals Engineering, vol. 16, Issue 6, Jun. 2003, pp. 563-565.

* cited by examiner

SYSTEM TO MANAGE WELLBORE SERVICING FLUIDS CONTAINING PARAMAGNETIC MATERIALS

PRIORITY

The present application is a U.S. National Stage patent application of International Patent Application No. PCT/US2019/050249, filed on Sep. 9, 2019, the benefit of which is claimed and the disclosure of which is incorporated herein by reference in its entirety.

FIELD OF THE DISCLOSURE

The present disclosure relates generally to the management and treatment of wellbore servicing fluids weighted with paramagnetic materials such as hematite and hematite composites (carbonate coated hematite etc.), and more particularly to a method for separating materials and managing used/spent fluids. A configurable multipole magnetic-based fluid diverter is used to concentrate paramagnetic materials using a magnetic field.

BACKGROUND

In the drilling of oil and gas wells by the rotary method, drilling fluid, commonly called "mud", is used to remove drill cuttings from the well. The mud circulates down through a drill string and out a drill bit at the lower end of the drill string and then circulates up through the wellbore to the earth's surface. Drill cuttings are removed from the mud by solids control equipment such as shale shakers and hydrocyclones, and the mud is recirculated back into the wellbore.

As the well depth increases, so does the earth's pressure. For effective well control in deep wells, the mud must be weighted with materials having a high specific gravity to prevent unwanted entry of formation fluids into the wellbore. Examples of weighting materials include barite, galena, lead oxide, barium carbonate, and iron oxide. While barite continues to be the most common weighting material for drilling fluids, as the world's supply of barite dwindles, the use of other weighting materials is increasing. A class of such other weighting materials have paramagnetic properties. Such paramagnetic weighting materials include, but are not limited to naturally occurring hematite ($Fe_2O_3$), as well as awaruite ($Ni_3Fe$), among others.

Since large quantities of weighting material are needed in drilling an oil well, it is desirable to recover the material and recycle it. Various solids control systems are in use today for separating the drill cuttings from the mud so that the mud's liquid component and the mud's weighting material can be recycled, leaving only drill cuttings for disposal. Most systems use a combination of one or more screens or sieves in a series relationship, with a final separating step using a mud cleaner or one or more centrifuges.

BRIEF DESCRIPTION OF THE DRAWINGS

The disclosure is described in detail hereinafter on the basis of embodiments represented in the accompanying figures, in which.

DESCRIPTION OF ILLUSTRATIVE EMBODIMENTS

Figure 1:
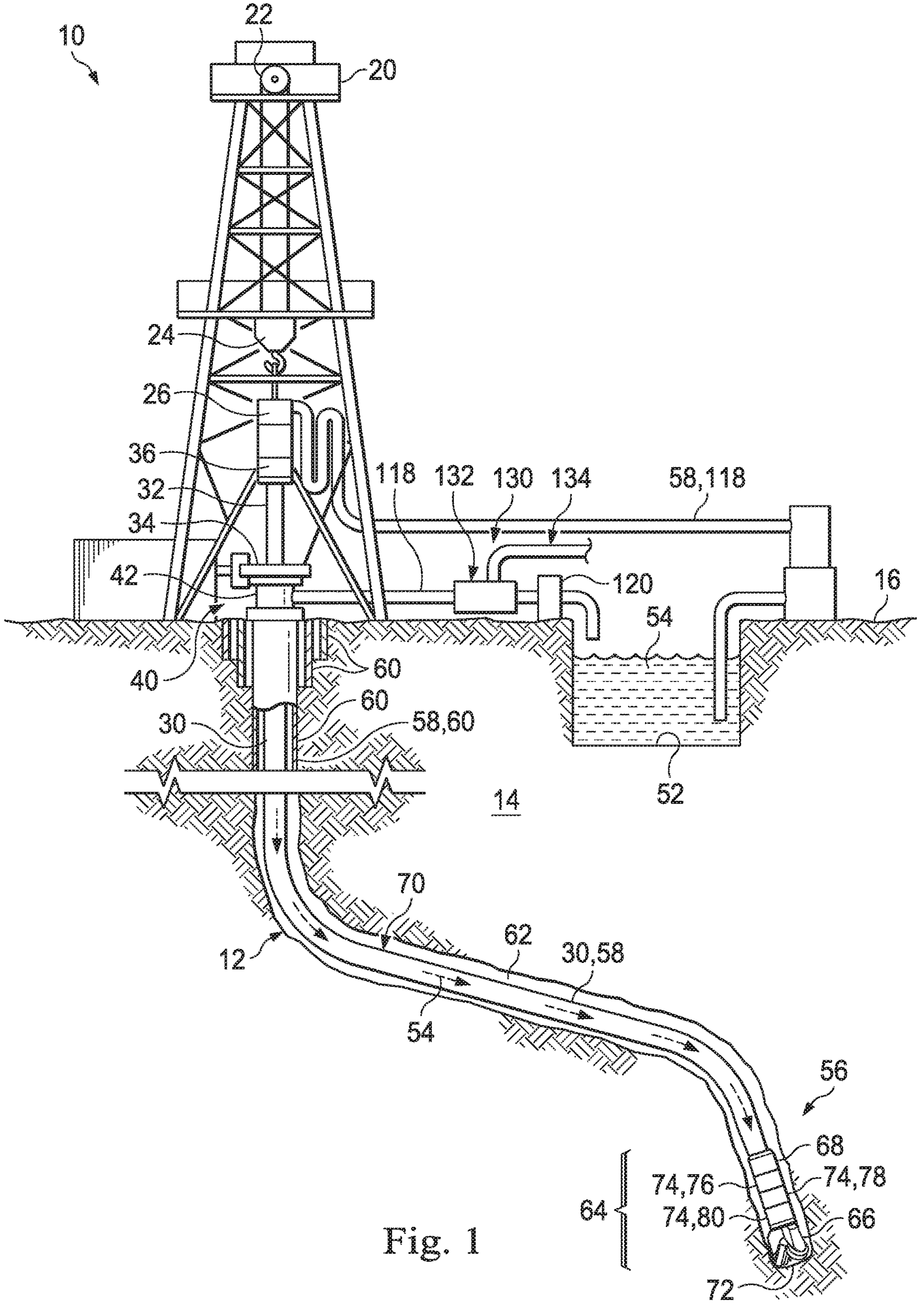
FIG. 1 is a cross-sectional schematic side view of a drilling system including a quadrupole fluid separation system in accordance with one or more exemplary embodiments of the disclosure.

Embodiments of the present disclosure relate to management and treatment of wellbore fluids weighted with paramagnetic materials by use of a dynamic multipole configurable magnetic particle diverter system. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict a horizontal wellbore or a vertical wellbore, unless indicated otherwise, it should be understood by those skilled in the art that the apparatus according to the present disclosure is equally well suited for use in wellbores having other orientations including vertical wellbores, deviated wellbores, multilateral wellbores or the like. Likewise, unless otherwise noted, even though a Figure may depict an offshore operation, it should be understood by those skilled in the art that the apparatus according to the present disclosure is equally well suited for use in onshore operations and vice-versa. Further, unless otherwise noted, even though a Figure may depict a cased hole, it should be understood by those skilled in the art that the apparatus according to the present disclosure is equally well suited for use in open hole operations.

Figure 2:
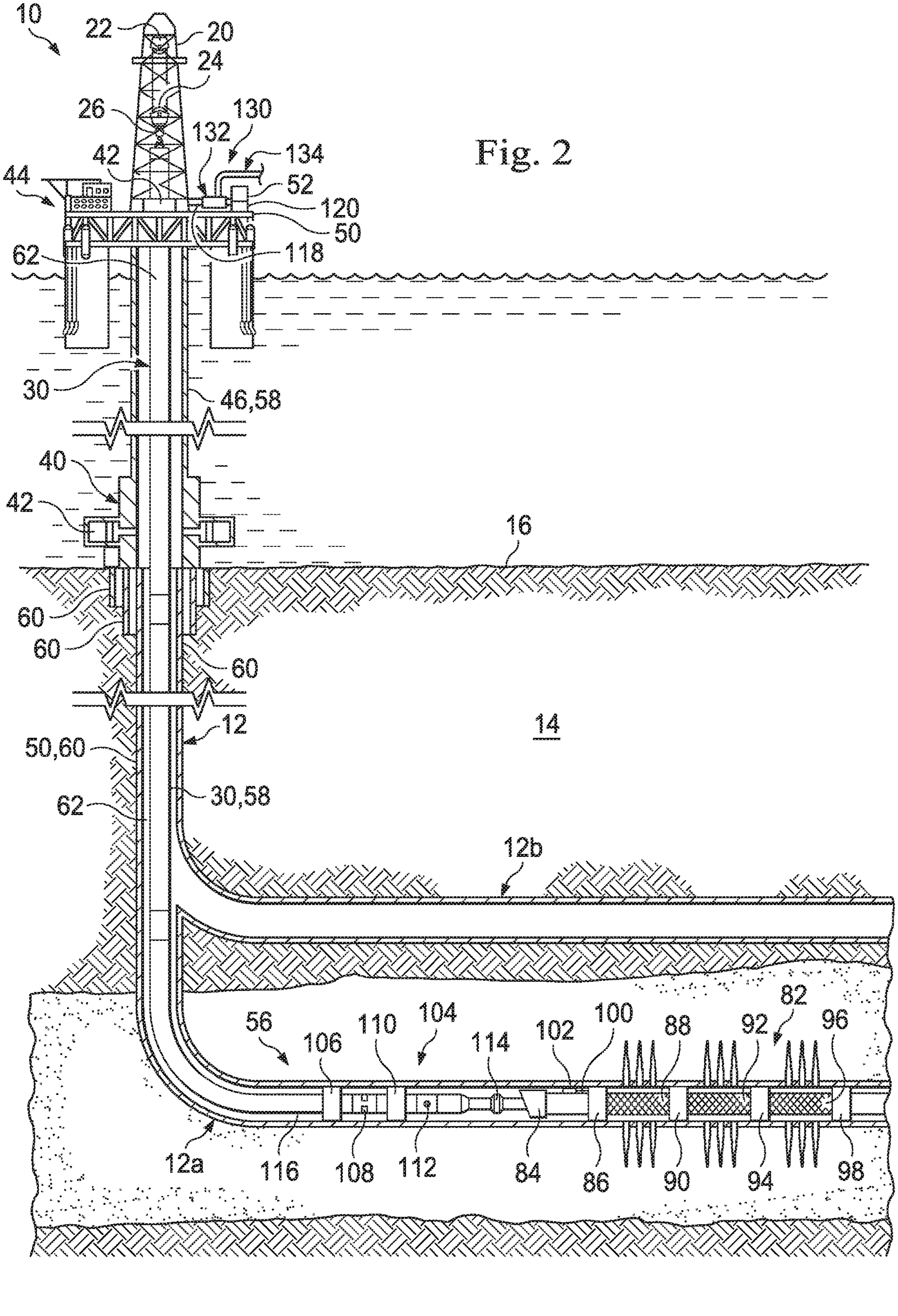
FIG. 2 is a cross-sectional schematic side view of an embodiment of a quadrupole fluid separation system of the disclosure deployed in a marine-based production system.

Turning to FIGS. 1 and 2, shown is an elevation view in partial cross-section of a wellbore drilling and production system 10 utilized to produce hydrocarbons from wellbore 12 extending through various earth strata in an oil and gas formation 14 located below the earth's surface 16. Wellbore 12 may be formed of a single or multiple boreholes 12*a*, 12*b* . . . 12*n* (illustrated in FIG. 2), extending into the formation 14, and disposed in any orientation, such as the horizontal borehole 12*b* illustrated in FIG. 2.

Drilling and production system 10 may include a drilling rig or derrick 20. Drilling rig 20 may include a hoisting apparatus 22, a travel block 24, and a swivel 26 for raising and lowering casing, liner, drill pipe, work string, coiled tubing, production tubing (including production liner and production casing), and/or other types of pipe or tubing strings collectively referred to herein as tubing string 30, or other types of conveyance vehicles, such as wireline, slickline or cable. In FIG. 1, conveyance vehicle 30 is a substantially tubular, axially extending drill string formed of a plurality of drill pipe joints coupled together end-to-end, while in FIG. 2, conveyance vehicle 30 is completion tubing supporting a completion assembly as described below. Drilling rig 20 may include a kelly 32, a rotary table 34, and other equipment associated with rotation and/or translation of tubing string 30 within a wellbore 12. For some applications, drilling rig 20 may also include a top drive unit 36.

Drilling rig 20 may be located proximate to a wellhead 40 as shown in FIG. 1, or spaced apart from wellhead 40, such as in the case of an offshore arrangement as shown in FIG. 2. One or more pressure control devices 42, such as blowout preventers (BOPs) and other equipment associated with drilling or producing a wellbore may also be provided at wellhead 40 or elsewhere in the system 10.

For offshore operations, as shown in FIG. 2, whether drilling or production, drilling rig 20 may be mounted on an oil or gas platform 44, such as the offshore platform as illustrated, semi-submersibles, drill ships, and the like (not shown). Although system 10 of FIG. 2 is illustrated as being a marine-based production system, system 10 of FIG. 2 may be deployed on land. Likewise, although system 10 of FIG. 1 is illustrated as being a land-based drilling system, system 10 of FIG. 1 may be deployed offshore. In any event, for marine-based systems, one or more subsea conduits or risers 46 extend from deck 50 of platform 44 to a subsea wellhead 40. Tubing string 30 extends down from drilling rig 20, through subsea conduit 46 and BOP 42 into wellbore 12.

A working or service fluid source 52, such as a storage tank or vessel, may supply a working fluid 54 pumped to the upper end of tubing string 30 and flow through tubing string 30. Working fluid source 52 may supply any fluid utilized in wellbore operations, including without limitation, drilling fluid, cementious slurry, acidizing fluid, liquid water, steam or some other type of fluid.

Wellbore 12 may include subsurface equipment 56 disposed therein, such as, for example, a drill bit and bottom hole assembly (BHA), a completion assembly or some other type of wellbore tool.

Wellbore drilling and production system 10 may generally be characterized as having a pipe system 58. For purposes of this disclosure, pipe system 58 may include casings, risers, tubing, drill strings, completion or production strings, subs, heads or any other pipes, tubes or equipment that attaches to the foregoing, such as string 30 and conduit 46, as well as the wellbore and laterals in which the foregoing may be deployed. In this regard, pipe system 58 may include one or more casing strings 60 that may be cemented in wellbore 12, such as the surface, intermediate and production casings 60 shown in FIG. 1. An annulus 62 is formed between the walls of sets of adjacent tubular components, such as concentric casing strings 60 or the exterior of tubing string 30 and the inside wall of wellbore 12 or casing string 60, as the case may be.

Where subsurface equipment 56 is used for drilling, conveyance vehicle 30 is a drill string, the lower end of which may include bottom hole assembly 64, which may carry at a distal end a drill bit 66. During drilling operations, weight-on-bit (WOB) is applied as drill bit 66 is rotated, thereby enabling drill bit 66 to engage formation 14 and drill wellbore 12 along a predetermined path toward a target zone. In general, drill bit 66 may be rotated with drill string 30 from rig 20 with a top drive 36 or rotary table 34, and/or with a downhole mud motor 68 within BHA 64. The working fluid 54 is pumped to the upper end of drill string 30 and flows through the longitudinal interior 70 of drill string 30, through bottom hole assembly 64, and exit from nozzles formed in drill bit 66. At bottom end 72 of wellbore 12, working fluid 54 may mix with formation cuttings, hydrocarbons, formation fluids and other downhole fluids and debris. The working fluid mixture may then flow upwardly as wellbore fluid through an annulus 62 to return formation cuttings and other downhole debris to the surface 16.

Bottom hole assembly 64 and/or drill string 30 may include various other tools 74, including a power source 76, mechanical subs 78 such as directional drilling subs, and measurement equipment 80, such as measurement while drilling (MWD) and/or logging while drilling (LWD) instruments, detectors, circuits, or other equipment to provide information about wellbore 12 and/or formation 14, such as logging or measurement data from wellbore 12.

Measurement data and other information from tools 74 may be communicated using electrical signals, pressure signals, acoustic signals or other telemetry that can be converted to electrical signals at the rig 20 to, among other things, monitor the performance of drilling string 30, bottom hole assembly 64, and associated drill bit 66, as well as monitor the conditions of the environment to which the bottom hole assembly 64 is subjected.

With respect to FIG. 2 where subsurface equipment 56 is illustrated as completion equipment, disposed in a substantially horizontal portion of wellbore 12 is a lower completion assembly 82 that includes various tools such as an orientation and alignment subassembly 84, a packer 86, a sand control screen assembly 88, a packer 90, a sand control screen assembly 92, a packer 94, a sand control screen assembly 96 and a packer 98.

Extending downhole from lower completion assembly 82 is one or more communication cables 100, such as a sensor or electric cable, that passes through packers 86, 90 and 94 and is operably associated with one or more electrical devices 102 associated with lower completion assembly 82, such as sensors position adjacent the sand control screen assemblies 88, 92, 96 or at the sand face of formation 14, or downhole controllers or actuators used to operate downhole tools or fluid flow control devices. Cable 100 may operate as communication media, to transmit power, or data and the like between lower completion assembly 82 and an upper completion assembly 104.

In this regard, disposed in wellbore 12 at the lower end of tubing string 30 is an upper completion assembly 104 that includes various tools such as a packer 106, an expansion joint 108, a packer 110, a fluid flow control module 112 and an anchor assembly 114.

Extending uphole from upper completion assembly 104 are one or more communication cables 116, such as a sensor cable or an electric cable, which passes through packers 106, 110 and extends to the surface 16. Cable 116 may operate as communication media, to transmit power, or data and the like between a surface controller (not pictured) and the upper and lower completion assemblies 104, 82.

In any of the drilling and production systems 10 as described above, whether for drilling fluids or production fluids, the wellbore fluids, such as drilling mud, hydrocarbons, steam and the like, along with solid matter such as cuttings and other debris, returning to surface 16 from wellbore 12 may be directed by a flow line 118 through a quadrupole fluid separation system 130, and thereafter into storage tanks 52 and/or additional processing systems 120, such as shakers, centrifuges and the like. Alternatively, in other embodiments, quadrupole fluid separation system 130 may be deployed downstream of additional processing systems 120 and/or storage tanks 52 for further processing after such fluids are processed by systems 120 or collected in storage tanks 52. As will be described in more detail below, in one or more embodiments, quadrupole fluid separation system 130 includes four spaced apart magnets positioned symmetrically around flow line 118 in order to establish a quadrupole magnetic field to guide lower density fluids into a central flow line and higher density fluids into a second flow line.

In one or more embodiments, quadrupole fluid separation system 130 is deployed to be in fluid communication with wellbore 12, and generally includes a first conduit 132, a second conduit 134, at least a portion of which is axially aligned within the first conduit 132., and a multipole magnet system 136 positioned around the first conduit 132. In one or more embodiments, first conduit 132 is in fluid communication with return flow line 118. While quadrupole fluid separation system 130 is illustrated as deployed along return flow line 118, quadrupole fluid separation system 130 may be deployed anywhere along a fluid flow path of drilling and production system 10, and more specifically anywhere along pipe system 58. For example, quadrupole fluid separation system 130 may be positioned downstream of storage tanks 52 or may be positioned along other flow lines, or downstream of processing systems 120 or may be positioned to treat working fluid 54 prior to injection into wellbore 12.

Figure 3A:
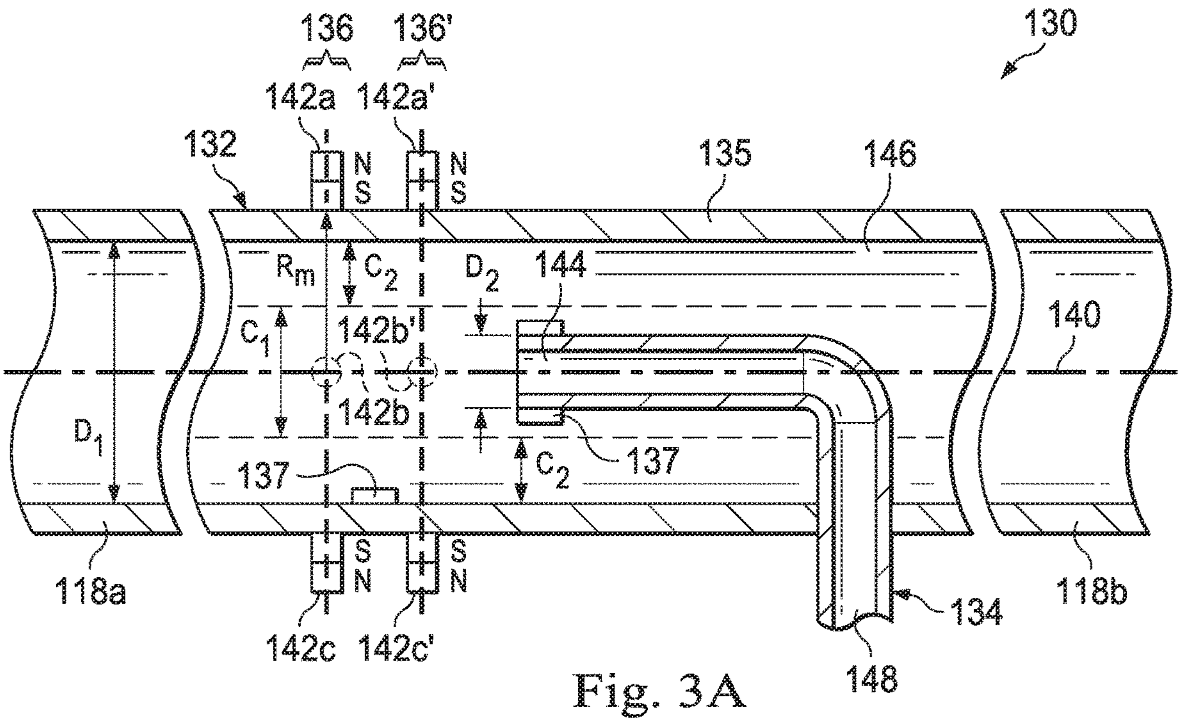
FIGS. 3A and 3B are cross-sectional schematic side views of the quadrupole fluid separation system of FIGS. 1 and 2.
Figure 3B:
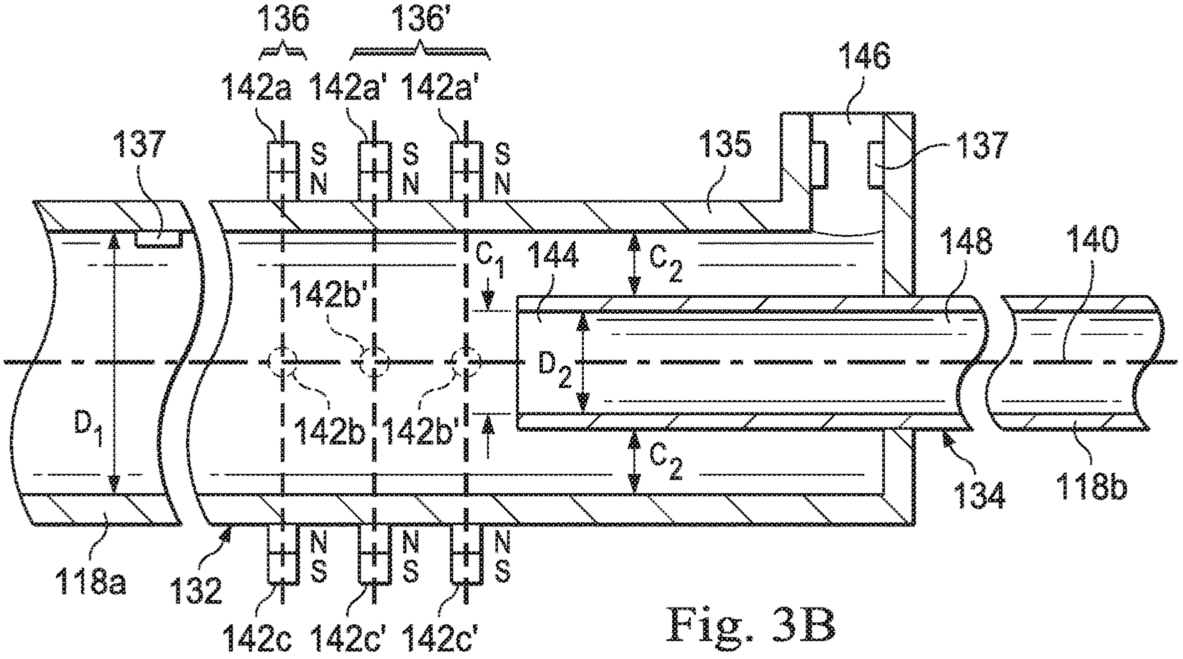

Turning to FIGS. 3A and 3B, embodiments of quadrupole fluid separation system 130 are illustrated in more detail. Quadrupole fluid separation system 130 generally includes a first tube or conduit 132, a second tube or conduit 134 at least a portion of which is axially aligned within the first conduit 132 along primary conduit axis 140, and a multipole magnet system 136 positioned around the first conduit 132. In one or more embodiments, first conduit 132 is in fluid communication with an upstream end 118*a* of return flow line 118. While quadrupole fluid separation system 130 is illustrated as deployed along return flow line 118 in the figures, quadrupole fluid separation system 130 may be deployed anywhere along a fluid flow path of drilling and production system 10, and more specifically anywhere along pipe system 58. For example, quadrupole fluid separation system 130 may be positioned downstream of storage tanks 52 (see FIG. 1) or may be positioned along other flow lines, or downstream of processing systems 120 or may be positioned to treat working fluid 54 prior to injection into wellbore 12 (see FIG. 1). In one or more embodiments, first conduit 132 is a portion of return flow line 118, while in other embodiments, first conduit 132 may be a separate tube or conduit. While the shapes of conduits 132 and 134 are not a limitation, in one or more embodiments, first conduit 132 is circular in cross-sectional area, with a diameter $D_1$ and second conduit 134 is circular in cross-sectional area with a diameter of $D_2$. In FIG. 3A, first conduit 132 is shown as being in fluid communication with the downstream end 118*b* of flow line 118, while in FIG. 3B, second conduit 134 is shown as being in fluid communication with the downstream end 118*b* of flow line 118. Thus, different configurations of first conduit 132 and second conduit 134 are contemplated depending on the anticipated flow regime of the separated fluids within quadrupole fluid separation system 130. For example, the diameter $D_2$ of second conduit 134 may be increased if it is anticipated that a larger volume of concentrated flow will consist primarily of non-paramagnetic materials or lower-density paramagnetic materials flow centrally in first conduit 132 and while a smaller volume of higher-density paramagnetic materials is attracted or driven by multipole magnet system 136 to the outer perimeter or radius of first conduit 132. A first flow path $C_1$ may defined generally formed adjacent to and along the primary axis 140*nd* a second flow path $C_2$ may be defined adjacent the parameter of first conduit 13, such as adjacent conduit wall 135.

In one or more embodiments, multipole magnet system 136 includes at least two magnets 142 symmetrically spaced about primary conduit axis 140 on opposite sides of first conduit 132. In other embodiments, multipole magnet system 136 is a quadrupole magnet system 136, wherein at least four magnets 142 are symmetrically spaced about primary conduit axis 140. In the illustrated embodiments of a quadrupole magnet system 136, magnet 142*a* is shown as opposing magnet 143*c* about axis 140 to form an opposing magnet pair. Likewise, magnet 142*b* opposes magnet 142*d* (not shown) to form an opposing magnet pair. In one or more embodiments, each pair of opposing magnets 142*a*, 142*c* and 142*b*, 142*d* are radially spaced approximately 180 degrees apart from one another about axis 140. Likewise, adjacent magnets are radially spaced approximately 90 degrees from one another. Thus, for example, magnet 142*a* is radially spaced 90 degrees from each of magnets 142*b* and 142*d*, while magnet 142*c* is radially spaced 90 degrees from each of magnets 142*b* and 142*d*. Moreover, in one or more embodiments, each of magnets 142*a*, 142*b*, 142*c* and 142*d* are located on the same radius $R_m$ relative to axis 140. However, depending on the strength of the magnets 142, one set of opposing magnets, such as 142*a*, 142*d*, may be spaced on a first radius $R_{m1}$, while the other set of opposing magnets, such as 142*b*, 142*d*, may be spaced on a second radius $R^{m2}$ which is different from the first radius $R_{m1}$.

Each magnet 142 has a S pole and a N pole, as illustrated. The magnets are arranged about axis 140 so that adjacent magnets 142 have opposite polarities, while opposing magnets 142 have the same polarity. For example, in the illustrated embodiment of FIG. 3A, first magnet 142*a* is shown as having an S pole arranged closest to axis 140, and third magnet 142*c*, which opposes first magnet 142*a*, likewise is arranged so that third magnet 142*c* has its S pole closest to axis 140. Magnets 142*b* and 142*d* on the other hand, which are adjacent to first magnet 142*a*, are arranged so that adjacent each has its N pole closest to axis 140. Alternatively, as shown in FIG. 3B, first magnet 142*a* may be arranged with its N pole closest to axis 140, and third magnet 142*c*, which opposes first magnet 142*a*, likewise is arranged so that third magnet 142*c* has its N pole closest to axis 140. In any event, the polarity of the magnets 142 as they are arranged about first conduit 132 alternate. In other embodiments, additional magnets 142 may be arranged about axis 140 so long as adjacent magnets closest to axis 140 are of opposite polarity and opposing magnet pairs closest to axis 140 are of the same polarity. In this arrangement, it will be understood that an "adjacent magnet" refers to a magnet on either side of a select magnet, even if each adjacent magnet is radially positioned less than 90 degrees apart from the select magnet. Thus, in one or more embodiments, such as is illustrated in FIG. 3, quadrupole magnet system 136 has at least four symmetrically spaced magnets 142 with two opposing magnet pairs. In one or more embodiments, quadrupole magnet system 136 may have at least eight symmetrically spaced magnets 142 with four opposing magnet pairs.

Magnet 142 is not limited to a particular type of magnet. Thus, in some embodiments, magnets 142 may be permanent magnets, while in other embodiments, magnets 142 may be electromagnets. Moreover, magnets 142 are not limited to a particular shape. In one or more embodiments, magnets 142 may be bar with one or the other of the polarities arranged closes to axis 140. In other embodiments, each magnet 142 may be an elongated rod or electrode extending along at least a portion of the length of first conduit 132. In this same vein, a plurality of quadrupole magnet systems 136 may be spaced apart along at least a portion of the length of conduit 132 so as to enhance paramagnetic fluid separation/concentration of a fluid as the fluid flows axially along conduit 132. Thus, in FIG. 3, one or more, or in some embodiments, a plurality, of additional quadrupole magnet systems 136' may be axially spaced apart along first conduit 132. In the illustrated embodiment, magnets 142' of the axially spaced quadrupoles magnet systems 136' are arranged to have the same polarity arrangement as the magnets 142 from which they are axially spaced. For example, magnet 142*a'* is shown as having an S pole closest to axis 140 the same as axially spaced magnet 142*a*. Likewise, magnet 142*c'* is shown as having its S pole closest to axis 140 the same as axially spaced magnet 142*c*. Although not shown in the FIG. 3, magnet 142*b'* would therefore be arranged to have its N pole closest to axis 140 in the same way that axially spaced magnet 142*b*. In any of the foregoing arrangements, it will be appreciated that magnets 142 with like polarities are arranged to oppose one another and magnets 142 of opposite polarities are arranged to be adjacent one another as described above.

In any event, paramagnetic materials carried in fluid passing along conduit 18 and into conduit 132 can be concentrated by static magnetic fields resulting from quadrupole magnet system 136. In other words, a fluid flowing in conduit 132 can be separated into flow regimes of different density based on paramagnetic materials, whereby higher density fluid, namely fluid with higher concentrations of paramagnetic materials, are concentrated adjacent the wall 135 of first conduit 132 and lower density fluid, namely fluid with lower concentrations of paramagnetic materials, are concentrated along central axis 140. For example, weighting materials such as hematite and/or other paramagnetic material associated with non-magnetic minerals in a wellbore fluid may be separated using the quadrupole magnet system 136. Similarly, paramagnetic material attached chemically to polymeric materials may be used to separate polymeric materials in a fluid. Thus, it will be appreciated that quadrupole magnet system 136 may be used to modify a fluid's composition and better enable separation and recovery of materials, as well as real time processing, to target a specific density, rheology, dielectric constant, filtration, lubricity or other physical properties of the materials in fluid.

In another embodiment, quadrupole magnet system 136 may be used to concentrate charged species, specifically organic species with charges, such as certain polymers and surfactants used in the oil-field, diverting charged species prior to reaching various equipment, such as drill-bits. Likewise, the quadrupole magnet system 136 may be used to reduce shear degradation of large PHPA polymers, commonly employed in drilling, by diverting the PHPA polymers prior to introduction into the drill bit, thereby reducing the amount of and peak shear felt by the polymer as it passes through the drill bit.

In any event, as shown in FIGS. 3A and 3B, the inlet 144 to conduit 134 is centrally positioned relative to conduit 132. Inlet 144 is generally positioned along axis 140. Where inlet 144 is circular in shape, inlet 144 may be coaxial with axis 140. Although not necessary so long as inlet 144 is generally positioned along or adjacent to axis 140, in one or more embodiments, at least a portion of conduit 134 extending from inlet 144 is coaxial with axis 140. In the illustrated embodiment of FIG. 3A, first conduit 132 has an outlet 146 that is in fluid communication with the downstream end 118*b* of flow line 118, while second conduit 134 has an outlet 148 separate from first conduit 132 and flow line 118, thereby permitting fluid concentrated and flowing along axis 140 to be removed from the flow stream progressing into the downstream end 118*b* of flow line 118. In the illustrated embodiment of FIG. 3B, first conduit 132 has an outlet 146 adjacent the perimeter of the of the first conduit 132, generally along outer wall 135. In this embodiment, second conduit 134 has an outlet 148 that is in fluid communication with the downstream end 118*b* of flow line 118, while first conduit 132 has an outlet 146 separate from second conduit 134 and flow line 118, thereby permitting fluid concentrated and flowing along axis 140 to continue progressing into the downstream end 118*b* of flow line 118. As fluids pass through the magnetic fields of quadrupole magnet system 136, components of a fluid flow having a lower density or concentration of paramagnetic material are concentrated about central axis 140 and flow into second conduit 134, while components of a fluid flow having a higher density or concentration of paramagnetic material are concentrated about outer wall 135 of first conduit 132 and may be removed via outlet 146.

In one or more embodiments, one or more magnetic field sensors 137 may be located along a flow path of multipole fluid separation system 130. Magnetic field sensors 137 may be configured to monitor the field strength of magnetic system 136 and detection of paramagnetic particle contained within a fluid flow. In one or more embodiments, such as the embodiment of FIG. 3A, the magnetic field sensor 137 may be positioned adjacent the inlet 144 of second conduit 134. In one or more embodiments, such as the embodiment of FIG. 3B, the magnetic field sensor 137 may be positioned downstream of inlet 144 of second conduit 134, such as adjacent the outlet 146 of first conduit 132. The magnetic field sensors 137 can be of any variety of magnetic field sensors, including but not limited to flux gates, magnetometers, Hall effect sensors, ferrous proximity sensors, optical magnetometers, atomic magnetometers, super conducting quantum interference device (SQUID) sensors, and a variety of solid state magnetic sensors.

Figure 4:
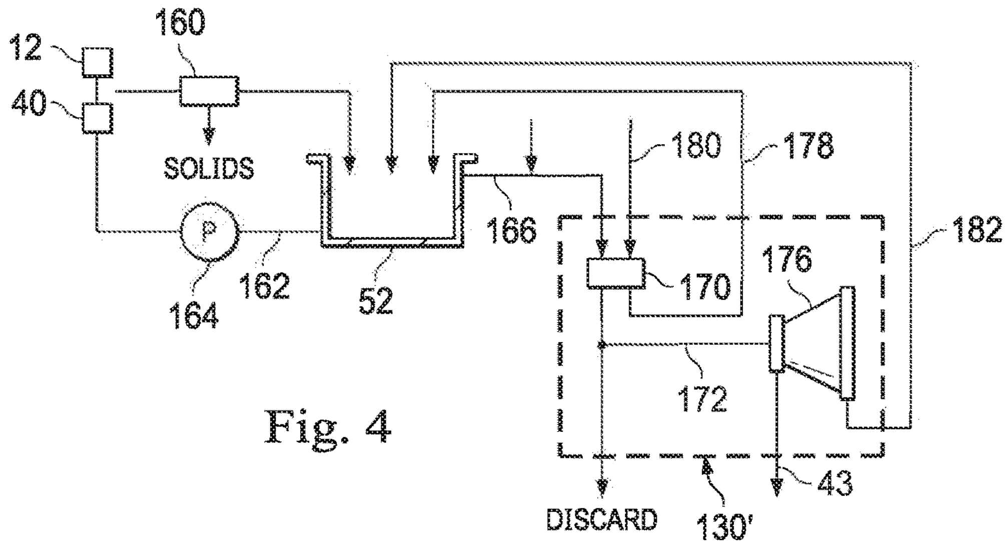
FIG. 4 is a schematic of one embodiment of quadrupole fluid separation system used in a drilling and production system.

FIG. 4 shows a schematic of one embodiment of quadrupole fluid separation system 130' used in a drilling and production system 10. Generally, from the wellhead 40, a wellbore fluid passes through a first processing system 120, such as a screen 160 to remove coarse drill cuttings. The remaining wellbore fluid then passes into a storage tank 52, which may be any container, vessel or pit for receipt wellbore fluids. From the storage tank 52, the wellbore fluid may be returned to the wellbore 12 by means of the mud pipe 162 and pump 164. All of these elements, including various pumps to assist the flow, such as suction pumps and the like, are well known to those skilled in the art of drilling oil and gas wells.

In one or more embodiments, wellbore fluid from storage tank 52 is passed through line 166 to a first quadrupole magnetic separator system 170. The flow steam from tank 52 may have both high-gravity, more-magnetic solids (such as paramagnetic weighted materials) as well as low-gravity, less-magnetic solids suspended in the liquid fluid flow. In one or more embodiments, first quadrupole magnetic separator system 170 has a low-field magnetic quadrupole to separate the high-gravity, more-magnetic solids from the flow stream. A flushing fluid, such as working fluid from storage tank 52, may be introduced into the first quadrupole magnetic separator system 170 through line 180 to flush the more-magnetic, high-gravity solids from the low-field magnetic separator system 180. The paramagnetic weighted materials flushed from the low-field magnetic separator system 170 may then be returned to the storage tank 52 through line 178 for reuse as a weighting material in the working fluid. The liquid containing the low-gravity, less-magnetic solids are discharged from first quadrupole magnetic separator system 170. In one or more embodiments, the low-field first quadrupole magnetic separator system 170 is sufficient for treating the wellbore fluid. However, in other embodiments, additional processing by a high-field magnetic quadrupole may be desirable. Thus, in some embodiments, the fluid flow discharged from the first quadrupole magnetic separator system 170 is passed through line 172 to a second quadrupole magnetic separator system 176. In one or more embodiments, second quadrupole magnetic separator system 176 has a high-field magnetic quadrupole. In any event, fluid flow discharged from first quadrupole magnetic separator 170 passes through line 172 to second quadrupole magnetic separator system 40. Second quadrupole magnetic separator system 176, having a high-field magnetic quadrupole, removes low-gravity, less-magnetic solids 43 that may be suspended in the flow stream. Thereafter, the flow stream can be sent through line 182 back to storage tank 52 for reuse in the drilling fluid system, or alternatively, if the flow stream is not needed, the effluent can be directed to reserve pits (not shown) for other uses. The low-gravity, less-magnetic solids may be flushed from second quadrupole magnetic separator system 176 and likewise collected as desired.

Figure 5:
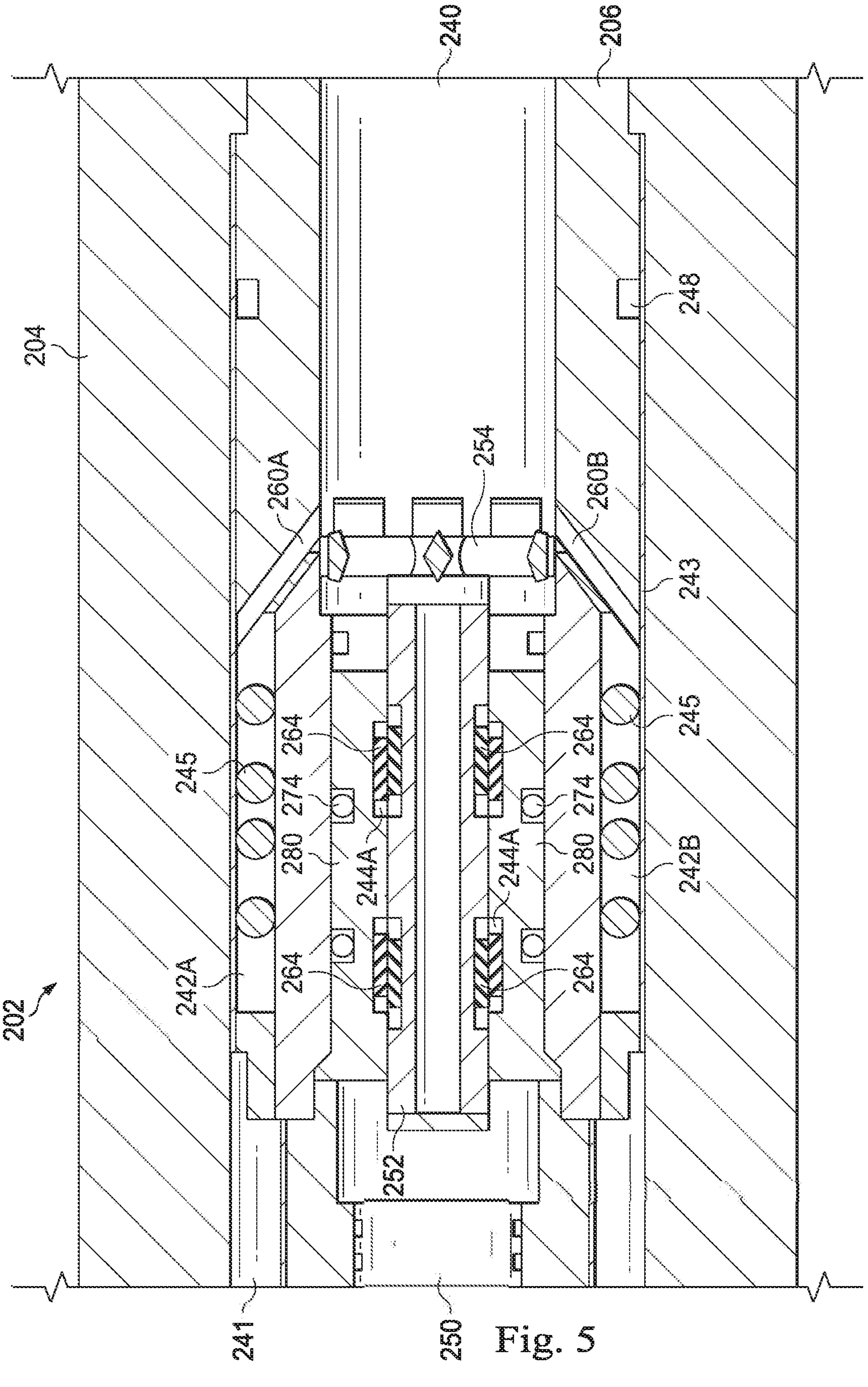
FIG. 5 depicts a longitudinal cross-section of one embodiment of a quadrupole fluid separation system.
Figure 6:
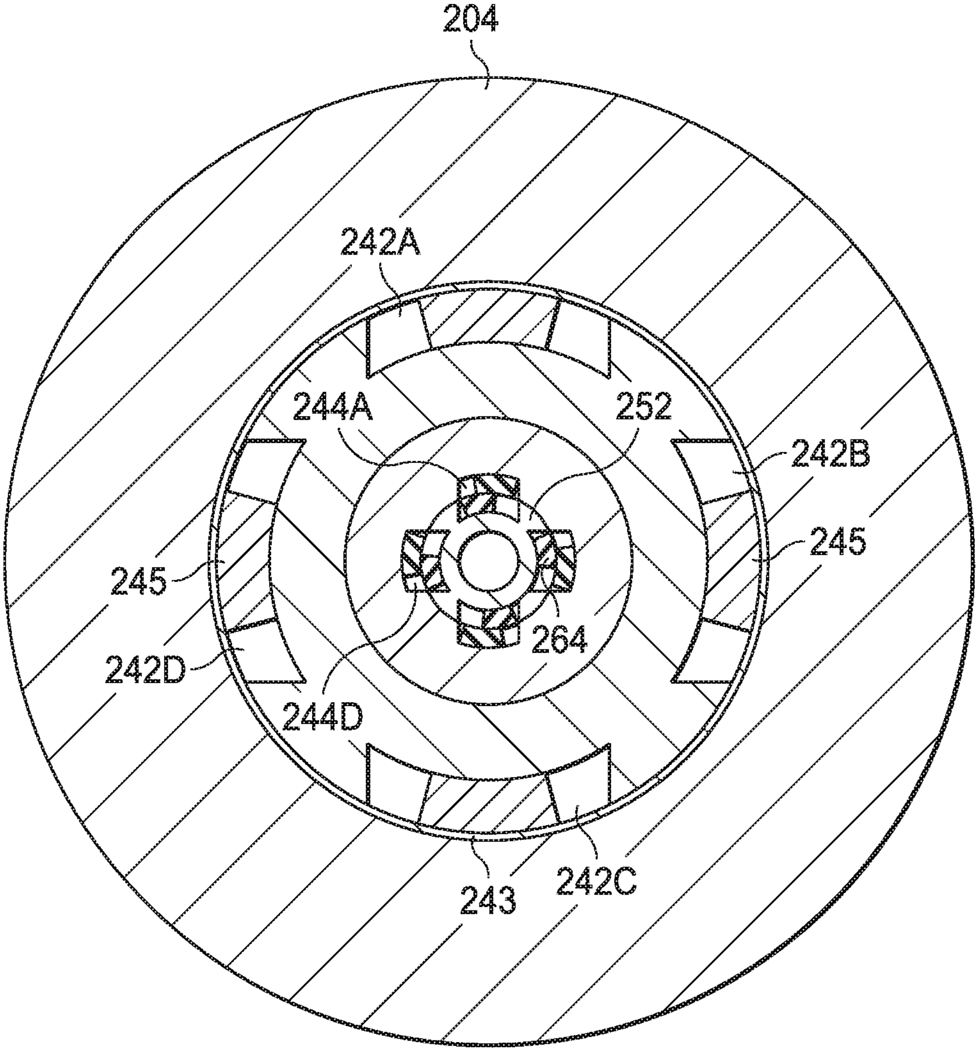
FIG. 6 depicts a lateral cross-section through the magnetic assembly of the magnetic separator system of FIG. 5.

FIG. 5 depicts an embodiment of a quadrupole magnetic separator systems 130 in greater detail, and partially in longitudinal cross-section, while FIG. 6 depicts a lateral cross-section thereof. In FIG. 5, a housing assembly 202 is shown having an outer housing 204 as well as a central insert 206. Central insert 206 sealingly engages the inner wall of outer housing 204. Central insert 206 includes two or more cavities around its outer surface extending generally to the inner diameter of the outer housing 204, such as are illustrated by cavities 242A and 242B. In one or more embodiments, four cavities 242 may be provided and equally spaced circumferentially about central insert 206 as depicted in FIG. 6. Cavities 242A and 242B may be covered with a hermetically sealed cover 243 to prevent fluid contamination of the cavities. The cavities 242 each receive a magnetic assembly 245 used to produce magnetic field gradients along the housing interior. Each magnetic assembly 245 may include one or more permeant magnets and/or one or more electromagnets. As will be appreciated, the strength of the magnetics, number of magnets in each magnetic assembly 245 and overall magnetic field strength of the system may be varied as required for a particular application. In any event, the cavities 242 may be backfilled with epoxy to further prevent fluid contamination of the magnetic assemblies. Electrical ports 260A and 260B may provide electrical connectivity between the magnetic assemblies 245 and an electronics insert housing (not shown). Electrical ports 260A and 260B may be backfilled with epoxy to prevent fluid entry into the electronics insert housing. Central insert 206 may include a plurality of generally radially extending outer fluid flow passageways 244A, 244B adjacent the inner wall of cavities 242A and 242B. The inner surfaces of passageways 244A and 244B can be coated with a hydrophobic material to prevent adhesion of the paramagnetic constructs to the inner surface of the outer fluid flow passageways. In one or more embodiments, each outer flow passageway 244A, 244B includes ports 264 along the surface to allow fluid to flow into the outer fluid flow passageways 244, to an outer exit bore 241 in central insert 206. Ports 264 can be configured to allow only weighted material within certain size regimes to enter the outer fluid flow passageways. Outer exit bore 241 may include fluid exit ports (not shown) that direct the paramagnetic weighted material into the annulus fluid stream outside of outer housing 204. One or more magnetic field sensors 274 may be located along outer fluid flow passageways 244A and 244B. Magnetic field sensors 274 may be configured to monitor the field strength of magnetic assemblies 245 and detection of paramagnetic particle constructs. The magnetic field sensors 274 can be of any variety of magnetic field sensors, including but not limited to flux gates, magnetometers, Hall effect sensors, ferrous proximity sensors, optical magnetometers, atomic magnetometers, super conducting quantum interference device (SQUID) sensors, and a variety of solid state magnetic sensors. Valve 254 allows for flow of fluid directly into the outer fluid flow passageways 244A and 244B from central conduit 240 bypassing port restrictors 264. In addition, valve 254 can be used to clear any blockage, caused by cuttings, of the ports 264 or outer fluid flow passageways 244A and 244B. The valve 254 may be configured to move between one or more positions relatively in registry with openings 248, to relatively close the fluid path from central conduit 240 and divert fluid directly into outer fluid flow passageway's 244A and 244B. Upon closure of openings 248, excess pressure generated in the outer flow passageway's 244A and 244B may be utilized to cause a series of pressure pulses that dislodge any particulate matter or cuttings blocking ports 264. Debris ejected from ports 264 may be expelled via central outlet port 250. Valve 254 is not limited to a particular configuration so long as it restricts fluid flow between openings 248 and the central conduit 240. In the depicted example, valve 254 includes a central hub 274. Central hub 274 facilitates the attachment of valve 254 to drive member 252. In one or more embodiments, valve 254 is constructed of a relatively lightweight material which is capable of withstanding the fluid pressures and downhole environments in which it will be used. In one or more embodiments, valve 254 may be constructed of titanium to minimize the mass of valve 254 thereby facilitating relatively rapid reciprocal or other movement within central bore 240. Other materials may include ceramic, stellite, and or tungsten carbide, each of which may offer particular advantages relative to specific downhole conditions.

In the depicted example, the fluid containing paramagnetic weighted material will flow from central bore 240 into the magnetic separator system. While fluid is flowing through central insert 206 the magnetic field generated by the magnetic assemblies 245 pulls the paramagnetically weighted material into the fluid flow outer passageways 244A and 244B and into outer exit bore 241. Any material diverted into outer exit bore 241 will be expelled into the annulus stream and recycled. Any weighted material not diverted into the outer passageways continue to flow out central exit bore 250. However, configurations are possible which would allow the flow to be in the opposite direction, such as if the described components were reversed in orientation. The described configuration is desirable, however, as it removes the system from the pressure exerted by the fluid column in the fluid conduit and allows reduced particle blockage in the outer flow passageway's. The placement and length of the passageway's 244A and 244B does not need to be substantially long to overcome the weight and flow rate of the fluid column when moving paramagnetic weighted particles to the outer flow pathway. The magnetic strength of the magnetic assemblies housed in cavities 242A and 242B can be increased to accommodate for a shorter outer flow passage. Examples of this configuration offer a significant advantage over other methods which have to overcome the weight and pressure of the fluid column when trying to divert drilling fluid based on particle properties.

Although systems with two cavities to hold magnetic assemblies were discussed above, in one or more embodiments, at least four cavities equally spaced circumferentially about the central insert 206 are utilized to produce a quadrupole field. A variety of magnetic assembly configurations can be implemented to achieve the desired quadrupole magnetic field effect. In one embodiment the magnetic assemblies consist of a series of individual magnets periodically placed about the cavity surface. In an alternative embodiment the magnetic assemblies can consists of one large magnet per cavity. In some embodiments the magnets are passive magnets to generate a static field. In other embodiments the magnets are DC or AC electromagnets to allow individual or group activation and/or switching of magnetic assemblies. Additionally, the electromagnets allow for either static (DC) or time-varying (AC) magnetic fields. In some embodiments the magnets are solid magnets. In other embodiments the magnets are liquid magnets. The magnets can be made of Ferrite and other rare earth elements such as high-grade neodymium.

In one or more embodiments a quadrupole magnetic separator system 130, such as first quadrupole magnetic separator system 170, has at least one active magnet assembly that will produce a time-varying magnetic field of at least 3000 gauss up to 20,000 gauss. In one or more embodiments, the quadrupole magnetic separator system 130 includes at least one passive magnetic assembly that generates a static magnetic field of at least 3000 to 20,000 gauss. Such a quadrupole magnetic separator system can include a series of magnetic separator housings 202 equally spaced apart along the fluid flow conduit or spaced apart at different distances from one another along the fluid conduit. In one embodiment the first quadrupole magnetic separator includes an active magnetic assembly that can be field strength adjusted to a high-field magnetic separator.

In one or more embodiments a quadrupole magnetic separator system 130, such as second quadrupole magnetic separator system 176 has at least one active magnet assembly that will produce a time-varying magnetic field of at least 20,000 gauss up to 50,000 gauss. In one embodiment the quadrupole magnetic separator system 130 includes at least one passive magnetic assembly that generates a static magnetic field of at least 20,000 to 50,000 gauss. Such a quadrupole magnetic separator system can include a series of magnetic separator housings 202 equally spaced apart along the fluid flow conduit or spaced apart at different distances from one another along the fluid flow conduit. In one embodiment the second quadrupole magnetic separator with an active magnetic assembly can be field strength adjusted to a low-field magnetic separator. In one or more embodiments a quadrupole magnetic separator 130 with an active magnetic assembly can be field strength adjusted between a low-field magnetic separator and a high-field magnetic separator.

In one embodiment the magnetic separator system 130 may be located downhole in the drill string. The downhole magnetic separator system 130 can be a low-field and/or high-field magnetic separator. In one or more embodiments, a downhole magnetic separator 130 has at least one active magnet assembly that will produce a time-varying magnetic field of at least 3000 gauss up to 50,000 gauss. In one or more embodiments, a downhole magnetic separator system 130 has at least one passive magnetic assembly that generates a static magnetic field of at least 3000 to 50,000 gauss. A downhole magnetic separator system 130 may include a series of magnetic separator housings 202 as described above, equally spaced apart along the drill string or spaced apart at different distances from one another along the drill string. In one embodiment the downhole magnetic separator system may include at least two magnetic separators housings 202 with different filter port sizes 264 to concentrate paramagnetic particles of different densities at different locations along the drill string. In another embodiment, a downhole magnetic separator may not include individual ports 264, but rather include a single opening along the length of the surface of the outer fluid flow passageway 244. In one embodiment, the field strength of each magnetic assembly housed in the magnetic separator 202 may be of equal strength. In an alternative embodiment each magnetic assembly may be of different strength from one another based on cavity azimuthal orientation and the drill string orientation with respect earth gravity and the formation.

Figure 7:
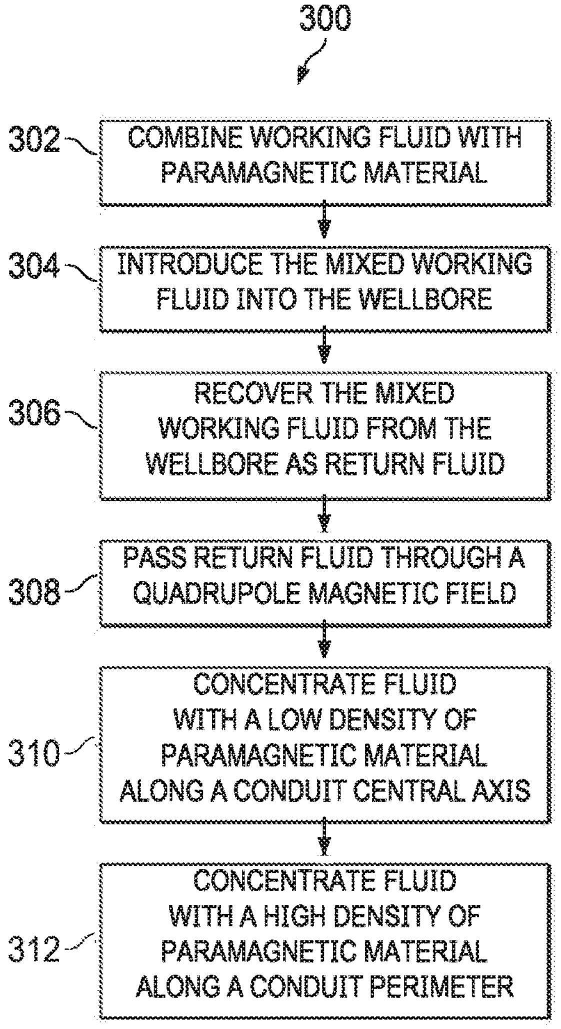
FIG. 7 is a flow chart illustrating a fluid separation method for use with hydrocarbon drilling and production.

Turning to FIG. 7, a flow chart illustrating a fluid separation method 300 for use with hydrocarbon drilling and production is illustrated. In a first step 302, a working fluid is charged or otherwise combined with a paramagnetic material. In one or more embodiments, the working fluid may be used during the drilling process, such as drilling mud, while in other embodiments, the working fluid may be used for well treatment, such as a hydraulic fracturing fluid or an acidizing fluid. In one or more embodiments, the working fluid may be water based or oil based. In one or more embodiments, the paramagnetic material is a weighting material, including but not limited to hematite and awaruite, as well as composites thereof such as hematite composites, for example, carbonate coated hematite. Thus, in step 302, where drilling mud is being prepared, a water or oil base is mixed with a paramagnetic weighting material. In other embodiments of step 302, where a hydraulic fracturing slurry is being prepared as the working fluid, the paramagnetic material may be introduced into a blender and mixed into the slurry. In one or more other embodiments, the paramagnetic material is a charged polymer or surfactant, such as charged organic species or PHPA polymers. In still yet other embodiments, the paramagnetic material may include a first paramagnetic material of a first low-density paramagnetic material and a second high-density paramagnetic material.

In step 304, the working fluid containing the paramagnetic material is introduced into the wellbore. In one or more embodiments, the working fluid is introduced into the wellbore during drilling. In some embodiments, the working fluid is pumped down a drill string to a drill bit. In other embodiments, the working fluid is pumped to a completion assembly installed in the wellbore. Where the working fluid containing paramagnetic material is a hydraulic fracturing slurry, the working fluid is pumped into the wellbore utilizing hydraulic fracturing pumps. In such case, in some embodiments, the working fluid may be introduced into the wellbore at pressures of between approximately 9000 PSI and 15,000 PSI and injected into the formation surrounding the wellbore. Likewise, even if not under the pressures associated with hydraulic fracturing, if the working fluid is being utilized for formation or wellbore treatment, the working fluid may be pumped into a completion assembly installed in the wellbore and injected into the surrounding formation.

In step 306, the working fluid, along with wellbore fluids and solids, is recovered from the wellbore as a return fluid. Specifically, the return fluid flow is directed back to the surface and into a return flowline, where the return fluid may be collected in a storage vessel or tank for subsequent treatment. In one or more embodiments, the return fluid may be directed to a first processing system to remove certain solids suspended in the return flow, such as drill cuttings. In this regard, one or more screens, sieves or shakers may be utilized to remove coarse drill cuttings from the return fluid. If the return fluid is collected in a storage vessel or tank, the return fluid may be processed by the first processing system before or after collection in the vessel or tank.

In step 308, the return fluid is passed through a magnetic field. In one or more embodiments, the magnetic field is a quadrupole magnetic field, such as may be generated by a quadrupole magnet system. The magnetic field may be static. The magnetic field may be an electromagnetic field. In some embodiments, the magnetic field may be time-varied. In one or more embodiments, the return fluid may be passed through a first magnetic field of a first strength and separately a second magnetic field of a second strength. The first magnetic field may be a low-field magnetic quadrupole and the second magnetic field is a high-field magnetic quadrupole. The first magnetic field strength may range between approximately 3000 gauss and 20,000 gauss, and the second magnetic field strength may range between approximately 20,000 gauss up to 50,000. In one or more embodiments, the return fluid is passed first through the first magnetic field and then through the second magnetic field, where the first magnetic field has a lower strength than the second magnetic field. In one or more embodiments, the magnetic field may be generated by a permanent magnetic, while in other embodiments, the magnetic field may be generated by electromagnets.

In some embodiments of step 308, the magnetic field strength may be altered based on the paramagnetic materials within the return fluid. In this regard, sensor may be utilized to measure the magnetic field and dynamically adjust the magnetic field in real time.

In step 310, the magnetic field is utilized to concentrate a first portion of the return fluid along a first flow path within a conduit and to concentrate a second portion of the return fluid along a second flow path within the conduit. In one or more embodiments, the first flow path is along a first diameter within the conduit and the second flow path is along a second diameter within the conduit, where the second diameter is larger than the first diameter. Thus, the first flow path may be generally formed adjacent and along the primary axis of the conduit and the second flow path may be formed adjacent the perimeter of the conduit, adjacent a conduit wall.

In one or more embodiments, the first portion of the return fluid contains materials that have no or low magnetic properties so as to be much less responsive to magnetic fields, whereas the second portion of the return fluid contains much more magnetically responsive materials. In this regard, the second portion of the return fluid at the second diameter is a much higher concentration or density of paramagnetic materials than the first portion of the return fluid. Where the paramagnetic field has been altered, adjusted or tuned to generate a magnetic field associated with a particular paramagnetic material in the return fluid, the second portion of the return fluid adjacent the perimeter of the conduit in which is flowing may contain a much larger concentration of that particular paramagnetic material. In any event, where the paramagnetic materials are used as a weighting material, such as in drilling mud, the paramagnetic material will have a higher density that other materials that may be included in the return fluid. Thus, low density, less magnetic materials will be concentrated along the primary axis of the conduit, while the high density, more magnetic materials will be concentrated adjacent the perimeter of the conduit.

In step 312, the flow paths are diverted from one another. In one or more embodiments, the first flow path is diverted from the second flow path, while in other embodiments, the second flow path is diverted from the first flow path. In one or more embodiments, an inlet may be positioned along the first flow path to divert the concentrated first portion of the return flow path. Once diverted from one another, fluid containing the higher concentration of paramagnetic materials can be stored separately from the remainder of the return fluid. Thereafter, as desired, the recovered paramagnetic materials can be reutilized, such as in mixing step 302, for reinjection into the wellbore.

Thus, a magnetic fluid separation system for use in treating wellbore fluids has been described. Embodiments of the wellbore fluid separation system may generally include a first tube disposed along a primary axis and having a first end and a second end; a second tube coaxially disposed in the first tube and having an inlet at a first end of the second tube, the second tube inlet being spaced apart from the first tube first end; and a multipole magnet system disposed around the first tube between the first end of the first tube and the first end of the second tube. In other embodiments, the system may include a first tube disposed along a primary axis and having a first end and a second end; a second tube having an inlet at a first end, the inlet positioned within the first tube along the primary axis between the first and second ends of the first tube; and a quadrupole magnet system disposed along the first tube between the first end of the first tube and the first end of the second tube, the quadrupole magnetic system having at least four radially spaced apart magnets positioned symmetrically around the first tube, where opposing magnets have the same polarity and adjacent magnets have the opposite polarity.

For any of the foregoing embodiments, the apparatus or system may include any one of the following elements, alone or in combination with each other:

A drill string having a drill bit, wherein the magnetic quadrupole fluid separation system is positioned along the drill string.

The multipole magnet system comprises a quadrupole magnet system having at least four spaced apart magnets positioned symmetrically around the first tube, where opposing magnets have the same polarity and adjacent magnets have the opposite polarity.

The magnets comprise permanent magnets.

The magnets comprise electromagnets.

The magnets are positioned on the same radius about the primary axis of the first tube.

The second tube extends coaxially with the first tube.

An outlet in the first tube adjacent an outer wall of the first tube.

A plurality of quadrupole magnet systems axially aligned along the first tube between the first end of the first tube and the first end of the second tube.

A magnetic field sensor disposed adjacent the multipole magnet system.

A plurality of a quadrupole magnet systems spaced apart axially along a portion of the length of the first tube, each quadrupole magnet system having at least four spaced apart magnets positioned symmetrically around the first tube, where opposing magnets have the same polarity and adjacent magnets have the opposite polarity.

A first quadrupole magnet system having a first magnetic field strength and a second quadrupole magnet system having a second magnetic field strength greater than the first magnetic field strength, the first quadrupole magnet system disposed along the first tube between the first end of the first tube and the first end of the second tube, and the second quadrupole system disposed along a tube downstream of the second tube inlet.

A first quadrupole magnet system having a first magnetic field strength and a second quadrupole magnet system having a second magnetic field strength greater than the first magnetic field strength, the first quadrupole magnet system disposed along the first tube between the first end of the first tube and the first end of the second tube, and the second quadrupole system disposed along a tube downstream of the second tube inlet.

An outlet in the first tube adjacent an outer wall of the first tube.

The magnets comprise field adjustable electromagnets.

Thus, a method for treating working fluids in the oil and gas industry has been described. Embodiments of the working fluid treatment method may generally include mixing a working fluid with a paramagnetic material; introducing the working fluid into a wellbore; recovering a return working fluid from the wellbore; passing the return working fluid through a quadrupole magnetic field; utilizing the quadrupole magnetic field to concentrate a first portion of the return working fluid at a first diameter within the conduit; and utilizing the quadrupole magnetic field to concentrate a second portion of the return working fluid at a second diameter within the conduit, wherein the second diameter is greater than the first diameter and wherein the second portion of the return fluid contains a higher density of paramagnetic materials than the first portion. Other embodiments of the working fluid treatment method may include combining a working fluid with a paramagnetic material; introducing the working fluid into a wellbore; recovering a return working fluid from the wellbore; passing the return working fluid through a dipole magnetic field; utilizing the dipole magnetic field to concentrate a first portion of the return working fluid at a first diameter within the conduit; and utilizing the dipole magnetic field to concentrate a second portion of the return working fluid at a second diameter within the conduit, wherein the second diameter is greater than the first diameter and wherein the second portion of the return fluid contains a higher density of paramagnetic materials than the first portion.

For the foregoing embodiments, the method may include any one of the following steps, alone or in combination with each other:

The working fluid is drilling mud and the paramagnetic material is a weighting material.

Separating the concentrated paramagnetic materials from the recovered return fluid.

Adjusting the strength of the quadrupole magnetic field to adjust the concentration amount of the paramagnetic material separated from the recovered return fluid.

The first portion of the return working fluid is concentrated axially along a central axis of a conduit and the second portion of the return working fluid is concentrated along a wall of the conduit.

Positioning an inlet along the central axis and directing flow of the first portion into the inlet.

Mixing comprises mixing a working fluid with a paramagnetic material selected from a group consisting of hematite, awaruite, hematite composites, carbonate coated hematite charged polymers, charged surfactants, charged organic species, and PHPA polymers.

Mixing comprises mixing a working fluid with a first paramagnetic material responsive to a first magnetic field strength and a second paramagnetic material responsive to a second magnetic field strength greater than the first magnetic field strength.

Combining comprises mixing.

Combining comprises mixing in a hydraulic fracturing blender

Mixing with drilling mud.

Mixing with hydraulic fracturing fluid.

Mixing with acidizing treatment fluid.

Injecting into a drill string.

Utilizing the paramagnetic material as weighting material for drilling mud.

Utilizing at least one of hematite, awaruite, hematite composites or carbonate coated hematite as the paramagnetic material.

Utilizing a charged polymer or surfactant or charged organic species or PHPA polymers as the paramagnetic material.

Combining comprises mixing a first paramagnetic material of a first low-density paramagnetic material and a second high-density paramagnetic material with a working fluid.

Pumping the mixed working fluid to a drill bit.

Pumping the mixed working fluid down a drill string.

Injecting the mixed working fluid into the formation around a completion string.

Utilizing hydraulic fracturing pumps to introduce the working fluid into a wellbore.

Collecting the recovered working fluid in a storage vessel or tank.

Prior to passing through a quadrupole magnetic field, collecting the recovered working fluid in a storage vessel or tank.

Prior to passing through a quadrupole magnetic field, removing drill cuttings from the recovered working fluid.

Prior to passing through a quadrupole magnetic field, removing solids from the recovered working fluid.

Passing the return fluid through a magnetic field.

Utilizing electromagnetics to create a quadrupole magnetic field.

Generating a static quadrupole magnetic field.

Generating a time-varied quadrupole magnetic field.

Passing the return working fluid through a first magnetic field of a first strength and through a second magnetic field of a second strength different than the first strength.

Passing the return working fluid through a low-field magnetic quadrupole and then through a high-field magnetic quadrupole.

Passing the return working fluid through a first magnetic field of magnetic field strength between approximately 3000 gauss and 20,000 gauss, thereafter, passing the return working fluid through a second magnetic field strength of approximately 20,000 gauss up to 50,000.

Altering the quadrupole magnetic field based on the paramagnetic materials within the return fluid.

Measuring a condition of the return working fluid and altering the quadrupole magnetic field based on the measured condition.

Measuring paramagnetic materials within the return working fluid and altering the quadrupole magnetic field based on the measured paramagnetic materials.

Altering the quadrupole magnetic field based on the paramagnetic materials combined with the working fluid.

Altering the quadrupole magnetic field based on the measured paramagnetic materials within the return fluid.

Measure the magnetic field and dynamically adjust the magnetic field in real time.

Concentrating a first portion of the return working fluid along a first flow path within a conduit and concentrating a second portion of the return working fluid along a second flow path within the conduit.

Concentrating a first portion of the return working fluid at a first diameter within the conduit and concentrating a second portion of the return working fluid at a second diameter within the conduit, where the second diameter is larger than the first diameter.

Concentrating a first portion of the return working fluid along the primary axis of the conduit and concentrating a second portion of the return working fluid adjacent the perimeter of the conduit.

Concentrating materials in the return working fluid that have no or low magnetic properties along the primary axis of the conduit and concentrating much more magnetically responsive materials adjacent the perimeter of the conduit.

Concentrating paramagnetic weighting material with a return drilling mud adjacent the perimeter of the conduit.

Diverting the flow path of concentrated paramagnetic material from the flow path of the return working fluid.

Diverting the return working fluid flow path from the flow path of the concentrated paramagnetic material.

Directing return working fluid with low amounts of paramagnetic material to an outlet positioned along a central axis of a flow conduit.

Passing the return working fluid through a dipole magnetic field.

Utilizing a dipole magnetic field to concentrate a first portion of the return working fluid at a first diameter within the conduit.

Utilizing a dipole magnetic field to concentrate a second portion of the return working fluid at a second diameter within the conduit.

Passing the return working fluid through a quadrupole magnetic field.

Utilizing a quadrupole magnetic field to concentrate a first portion of the return working fluid at a first diameter within the conduit.

Utilizing a quadrupole magnetic field to concentrate a second portion of the return working fluid at a second diameter within the conduit.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. A method for treating working fluids in the oil and gas industry, the method comprising:

combining a working fluid with a paramagnetic material;

introducing the working fluid into a wellbore;

passing the return working fluid through a quadrupole magnetic field;

measuring a magnetic field of the return working fluid;

dynamically adjusting the quadrupole magnetic field to concentrate a first portion of the return working fluid at a first diameter within the conduit; and utilizing the dynamically adjusted quadrupole magnetic field to concentrate a second portion of the return working fluid at a second diameter within the conduit, wherein the second diameter is greater than the first diameter;

wherein a magnetic field sensor is located inside the second diameter and another magnetic field sensor is located outside the first diameter; and wherein the second portion of the return fluid contains a higher density of paramagnetic materials than the first portion.

2. The method of claim 1, wherein the working fluid is drilling mud and the paramagnetic material is a weighting material.

3. The method of claim 1, further comprising separating the concentrated paramagnetic materials from the recovered return fluid.

4. The method of claim 3, further comprising adjusting the strength of the quadrupole magnetic field to adjust the concentration amount of the paramagnetic material separated from the recovered return fluid.

5. The method of claim 1, wherein the first portion of the return working fluid is concentrated axially along a central axis of a conduit and the second portion of the return working fluid is concentrated along a wall of the conduit.

6. The method of claim 5, further comprising positioning an inlet along the central axis and directing flow of the first portion into the inlet.

7. The method of claim 1, wherein mixing comprises mixing a working fluid with a paramagnetic material selected from a group consisting of hematite, awaruite, hematite composites, carbonate coated hematite charged polymers, charged surfactants, charged organic species, and PHPA polymers.

8. A magnetic multipole fluid separation system for the oil and gas industry comprising:

a housing assembly having an outer housing and a central insert, wherein the central insert sealingly engages an inner wall of the outer housing and includes at least two cavities around its outer surface extending to an inner diameter of the outer housing, wherein the at least two cavities are covered with a hermetically sealed cover to prevent fluid contamination of the cavities;

a magnetic assembly located in each one of the at least two cavities, wherein each magnetic assembly comprises one or more permanent magnets or one or more electromagnets;

an electronics insert housing connected to the magnetic assembly through electrical ports;

at least two radially extending outer fluid flow passageways adjacent the inner wall of the at least two cavities, wherein the inner surfaces of the at least two radially extending outer fluid flow passageways are coated with a hydrophobic material;

at least one port along a surface of the at least two radially extending outer fluid flow passageways;

an outer exit bore in the central insert comprising fluid exit ports connected to an annulus fluid stream outside of outer housing;

a central conduit; and a valve to control flow of fluid from central conduit into the at least two radially extending outer fluid flow passageways.

9. The system of claim 8, wherein the magnetic assembly comprises a quadrupole magnet system having at least four spaced apart magnets positioned symmetrically in the at least two cavities, where opposing magnets have the same polarity and adjacent magnets have the opposite polarity.

10. The system of claim 9, wherein the magnetic assembly comprises one or more permanent magnets.

11. The system of claim 8, wherein the magnetic assembly comprises one or more electromagnets.

12. The system of claim 8, further comprising a central outlet port.

13. The system of claim 8, wherein the magnetic assembly comprises a plurality of quadrupole magnet.

14. The system of claim 8, further comprising a magnetic field sensor disposed adjacent the multipole magnet system.

15. A magnetic quadrupole fluid separation system for the oil and gas industry comprising:

a first tube disposed along a primary axis and having a first end and a second end;

a second tube having an inlet at a first end, the inlet positioned within the first tube along the primary axis between the first and second ends of the first tube;

a valve to control flow of fluid into the first tube and the second tube, wherein the valve can stop the flow of fluid into the first tube and divert it into the second tube, wherein the valve is constructed from titanium, ceramic, stellite, or tungsten carbide; and a quadrupole magnet system disposed along the first tube between the first end of the first tube and the first end of the second tube, the quadrupole magnetic system having at least four radially spaced apart magnets positioned symmetrically around the first tube, where opposing magnets have the same polarity and adjacent magnets have the opposite polarity.

16. The system of claim 15, further comprising a plurality of a quadrupole magnet systems spaced apart axially along a portion of the length of the first tube, each quadrupole magnet system having at least four spaced apart magnets positioned symmetrically around the first tube, where opposing magnets have the same polarity and adjacent magnets have the opposite polarity.

17. The system of claim 15, further comprising a first quadrupole magnet system having a first magnetic field strength and a second quadrupole magnet system having a second magnetic field strength greater than the first magnetic field strength, the first quadrupole magnet system disposed along the first tube between the first end of the first tube and the first end of the second tube, and the second quadrupole system disposed along a tube downstream of the second tube inlet.

18. The system of claim 15, wherein the valve comprises a central hub and the valve is attached to a drive member.

19. The system of claim 15, further comprising an outlet in the first tube adjacent an outer wall of the first tube.

20. The system of claim 15, wherein the magnets comprise field adjustable electromagnets.

* * * * *